(12) United States Patent
Park et al.

(10) Patent No.: US 11,527,772 B2
(45) Date of Patent: Dec. 13, 2022

(54) APPARATUS FOR EVALUATING PERFORMANCE OF FUEL CELL STACK

(71) Applicant: LG CHEM, LTD., Seoul (KR)

(72) Inventors: Sun Young Park, Daejeon (KR); Kwangwook Choi, Daejeon (KR); Yeonhyuk Heo, Daejeon (KR); Kwangyeon Park, Daejeon (KR); Sanghyun Park, Daejeon (KR); Daehwan Kim, Daejeon (KR); Cheolju Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 200 days.

(21) Appl. No.: 16/958,088

(22) PCT Filed: Mar. 25, 2019

(86) PCT No.: PCT/KR2019/003438
§ 371 (c)(1),
(2) Date: Jun. 25, 2020

(87) PCT Pub. No.: WO2019/203466
PCT Pub. Date: Oct. 24, 2019

(65) Prior Publication Data
US 2021/0028479 A1 Jan. 28, 2021

(30) Foreign Application Priority Data
Apr. 17, 2018 (KR) .................. 10-2018-0044319

(51) Int. Cl.
*H01M 8/248* (2016.01)
*H01M 8/04313* (2016.01)
*H01M 8/04701* (2016.01)

(52) U.S. Cl.
CPC ....... *H01M 8/248* (2013.01); *H01M 8/04313* (2013.01); *H01M 8/04701* (2013.01)

(58) Field of Classification Search
CPC ............. H01M 8/248; H01M 8/04313; H01M 8/04701
See application file for complete search history.

(56) References Cited

U.S. PATENT DOCUMENTS 7,205,062 B2    4/2007    Tawfik et al.
9,991,546 B2    6/2018    Lee et al.
(Continued)

FOREIGN PATENT DOCUMENTS

CN    201699084 U    1/2011
CN    202719992    *    2/2013
(Continued)

OTHER PUBLICATIONS

CN 202719992 MT (Year: 2013).*
(Continued)

*Primary Examiner* — Alexander Usyatinsky
(74) *Attorney, Agent, or Firm* — Myers Bigel, P.A.

(57) ABSTRACT

The present invention relates to an apparatus for evaluating a performance of a fuel cell stack, and more particularly, to an apparatus for evaluating a performance of a fuel cell stack, in which a guide unit and an arm are provided on an anode end plate and a cathode end plate, respectively, to minimize an inclination of the fuel cell stack caused by a shrinkage of a sealant.

21 Claims, 3 Drawing Sheets

(a)

(b)

(56) References Cited

U.S. PATENT DOCUMENTS

| | | | |
|---|---|---|---|
| 10,033,060 B2 | 7/2018 | Watanabe | |
| 2007/0154761 A1* | 7/2007 | Eun | H01M 8/006 |
| | | | 429/514 |
| 2011/0221450 A1* | 9/2011 | Lee | H01M 8/248 |
| | | | 324/600 |
| 2015/0264765 A1* | 9/2015 | Gerszberg | H05B 45/20 |
| | | | 315/297 |
| 2015/0364785 A1 | 12/2015 | Lee et al. | |
| 2017/0207477 A1* | 7/2017 | Heinzmann | H01M 8/2404 |

FOREIGN PATENT DOCUMENTS

| | | | |
|---|---|---|---|
| CN | 202719992 U | | 2/2013 |
| EP | 1816698 | | 8/2007 |
| JP | 2006-507651 | | 3/2006 |
| JP | 2006507651 | * | 3/2006 |
| JP | 2008-234920 | | 10/2008 |
| JP | 4262510 | | 5/2009 |
| JP | 2014-238922 | | 12/2014 |
| JP | 2015-165488 | | 9/2015 |
| KR | 10-2010-0079044 | | 7/2010 |
| KR | 10-2011-0135286 | | 12/2011 |
| KR | 10-2015-0026606 | | 3/2015 |
| KR | 10-1664547 | | 10/2016 |
| KR | 10-2017-0037437 | | 4/2017 |

OTHER PUBLICATIONS

19787717, Decision_to_grant _a_European_patent, dated Jan. 13, 2022 (Year: 2022).*

19787717,Amended_claims_filed_after_rec . . . European)_search_report, dated Jun. 10, 2021 (Year: 2022).*

The Decision of JPO to grant a Patent for Application No. JP 2020-535631 (dated 2021).*

Extended European Search Report corresponding to European Patent Application No. 19787717.8 (7 pages) (dated Nov. 23, 2020).

English translation of International Search Report corresponding to International Patent Application No. PCT/KR2019/003438 (2 pages) (dated Jun. 24, 2019).

* cited by examiner

US 11,527,772 B2

APPARATUS FOR EVALUATING PERFORMANCE OF FUEL CELL STACK

TECHNICAL FIELD CROSS REFERENCE TO RELATED APPLICATIONS

This application is a 35 U.S.C. § 371 national stage application of PCT International Application No. PCT/KR2019/003438, filed Mar. 25, 2019, which claims priority from Korean Patent Application No. 10-2018-0044319, filed Apr. 17, 2018, the contents of which are incorporated herein in their entireties by reference. The above-referenced PCT International Application was published in the Korean language as International Publication No. WO 2019/203466 A1 on Oct. 24, 2019.

TECHNICAL FIELD

The present invention relates to an apparatus for evaluating a performance of a fuel cell stack, and more particularly, to an apparatus for evaluating a performance of a fuel cell stack, in which a guide unit and an arm are provided on an anode end plate and a cathode end plate, respectively, to minimize an inclination of the fuel cell stack caused by a shrinkage of a sealant.

BACKGROUND ART

A fuel cell is a cell that converts chemical energy, which is produced by oxidation, directly into electrical energy, and is a new, environmentally-friendly, and future energy technology that generates electrical energy from substances such as hydrogen and oxygen that are abundant on the earth.

In the fuel cell, oxygen is supplied to an air electrode (cathode), and hydrogen is supplied to a fuel electrode (anode), such that an electrochemical reaction is performed in the form of a reverse reaction for electrolyzing water and produces electricity, heat, and water, thereby generating electrical energy with high efficiency without causing pollution.

In this case, because there is a limitation in producing a voltage from a single unit cell in the fuel cell, separating plates and unit cells are stacked several times, and end plates are provided at both sides of the configuration made by stacking the separating plates and a fuel cell stack to support the configuration, such that the fuel cell is used in the form of a stack.

External factors, which greatly affect an operation of the fuel cell, need to be uniformly maintained to evaluate a performance of the fuel cell. Examples of the factors may include a surface pressure, an operating temperature, a flow rate of gas to be supplied, and humidity.

However, if there occurs an error in respect to even one factor at the time of evaluating the performance of the fuel cell, there is a problem in that reliability of the evaluated performance of the fuel cell inevitably deteriorates.

FIG. 1 is a view illustrating an apparatus for evaluating a characteristic of a fuel cell in the related art. To evaluate a performance of the fuel cell stack, a high-temperature environment is provided, and a surface pressure is applied in a vertical direction to ensure a performance of the fuel cell stack by implementing excellent connection between respective components in the fuel cell stack, such as a cell, a current collector, and a connector (interconnector).

Because a sealant, which bonds the respective components in the fuel cell stack, has fluidity at a high temperature, a height of the fuel cell stack is decreased when a surface pressure is applied. In this case, there is a problem in that the fuel cell stack is inclined because the sealant does not uniformly shrink due to a gradient of distribution of internal temperatures.

Further, there is a problem in that because a load applied to the fuel cell stack is not uniformly transmitted, there is damage to the unit cell or a loss of performance of the fuel cell caused by a partial contact defect.

In this regard, there is a need for an apparatus for evaluating a performance of a fuel cell stack, which is capable of preventing an inclination of the fuel cell stack by allowing a sealant to uniformly shrink at a high temperature when evaluating the performance.

DETAILED DESCRIPTION OF THE INVENTION

Technical Problem

The present invention has been made in an effort to solve the above-mentioned problems, and an object of the present invention is to provide an apparatus for evaluating a performance of a fuel cell stack, in which a guide unit and an arm, which are movable vertically, are detachably coupled to one surface of an anode end plate and one surface of a cathode end plate, respectively, to prevent an inclination of the fuel cell stack.

Technical Solution

An apparatus for evaluating a performance of a fuel cell stack according to an exemplary embodiment of the present invention includes: a main body; an anode end plate which is positioned at an upper side of a fuel cell stack and has guide units provided on one or more lateral surfaces of the anode end plate; a cathode end plate which is positioned at the other side of the fuel cell stack and has arms provided on one or more lateral surfaces of the cathode end plate; and a surface pressure module which is configured to apply a surface pressure to the cathode end plate.

In one exemplary embodiment, the arm may be configured to correspond to the guide unit and may vertically move the cathode end plate by the pressure applied from the surface pressure module.

In one exemplary embodiment, the guide unit and the arm may be made of a ceramic material.

In one exemplary embodiment, the guide units may be provided on the four lateral surfaces of the anode end plate, respectively.

In one exemplary embodiment, the arms may be provided on the four lateral surfaces of the cathode end plate, respectively.

In one exemplary embodiment, the guide unit may have a position determining unit configured to adjust the horizontal position of the fuel cell stack.

In one exemplary embodiment, the arm may include: a wheel which moves along the guide unit; and a support portion which connects the wheel with the cathode end plate.

In one exemplary embodiment, the guide unit may include a rail which guides a vertical movement of the arm.

Advantageous Effects

According to the present invention, with the guide unit and the arm which are provided on the anode end plate and the cathode end plate, respectively, a sealant in the fuel cell stack uniformly shrinks, and thus an inclination of the fuel cell stack is minimized, and as a result, there is an effect in that a load is uniformly applied to the fuel cell stack and damage to a unit cell or a contact defect is prevented.

BEST MODE

Figure 1:
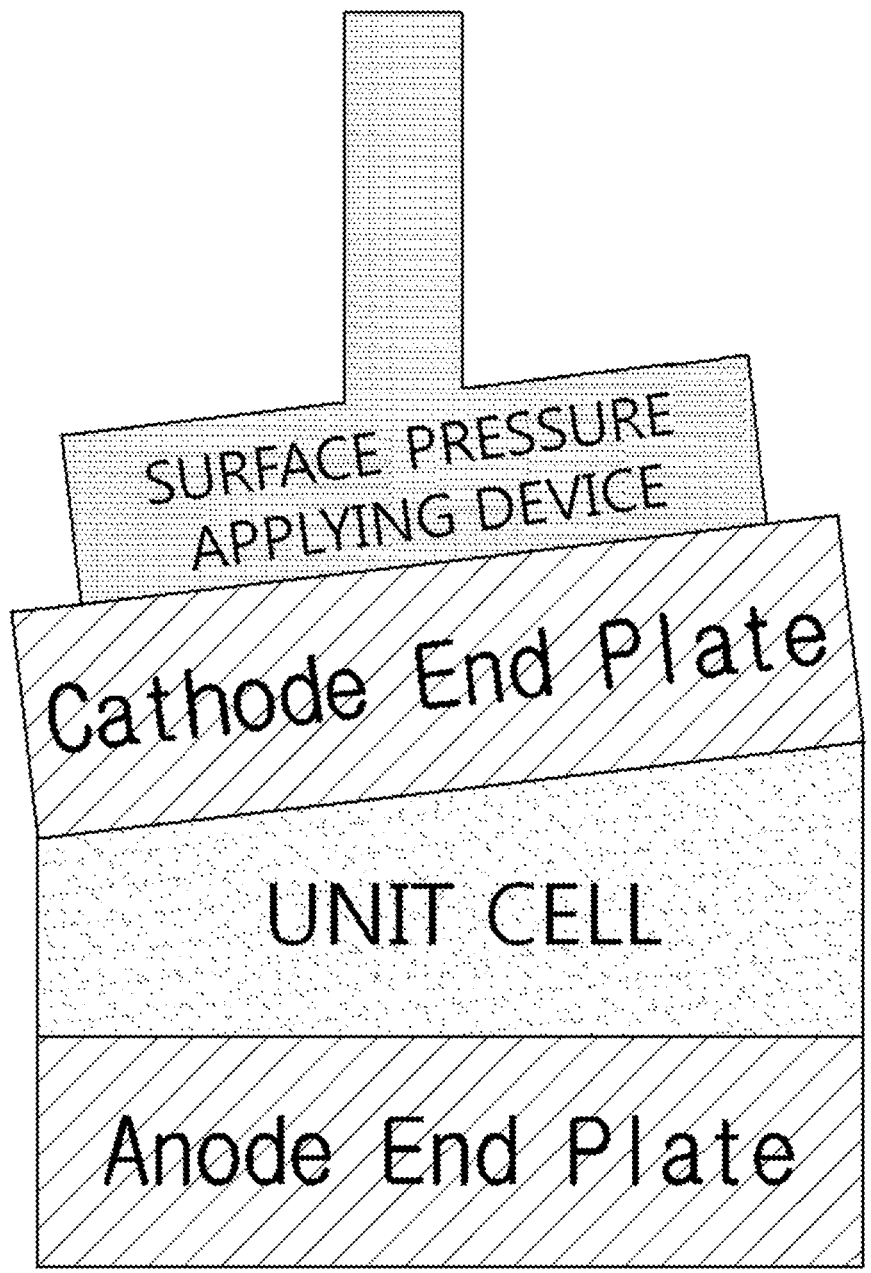
FIG. 1 is a view illustrating an apparatus for evaluating a characteristic of a fuel cell in the related art.

Hereinafter, the present invention will be described in detail with reference to the accompanying drawings. Here, repeated descriptions, and detailed descriptions of publicly known functions and configurations will be omitted so as to avoid unnecessarily obscuring the subject matter of the present invention. Exemplary embodiments of the present invention are provided to completely explain the present invention to a person with ordinary skill in the art. Therefore, shapes and sizes of elements illustrated in the drawings may be exaggerated for a more apparent description.

Throughout the specification, unless explicitly described to the contrary, the word "comprise" or "include" and variations, such as "comprises", "comprising", "includes" or "including", will be understood to imply the inclusion of stated constituent elements, not the exclusion of any other constituent elements.

Hereinafter, exemplary embodiments are proposed to help understand the present invention. However, the following exemplary embodiments are provided just for more easily understanding the present invention, and the contents of the present invention are not limited by the exemplary embodiments.

Apparatus for Evaluating Performance of Fuel Cell Stack

Figure 2:
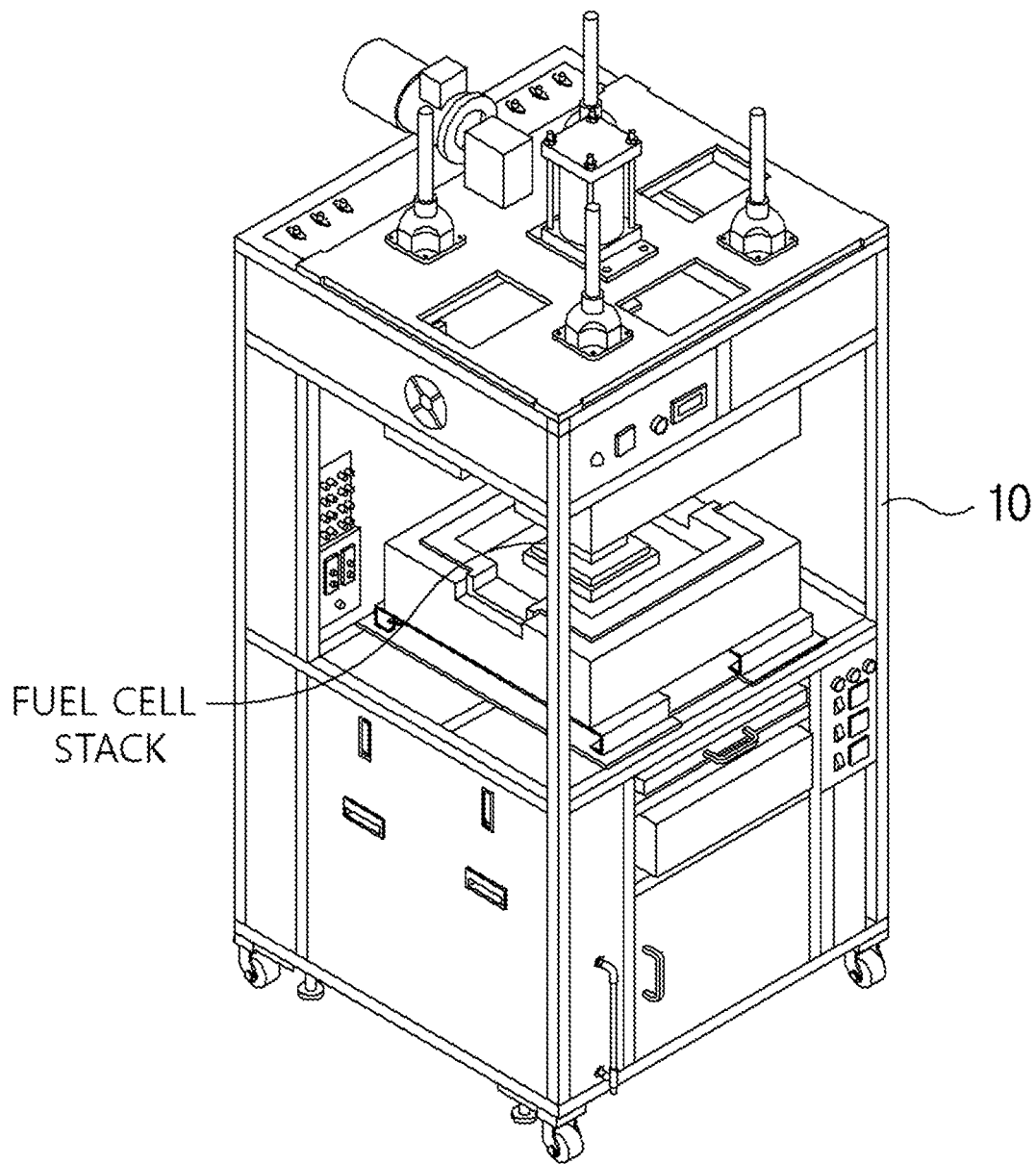
FIG. 2 is a perspective view illustrating an apparatus for evaluating a performance of a fuel cell stack according to an exemplary embodiment of the present invention.
Figure 3:
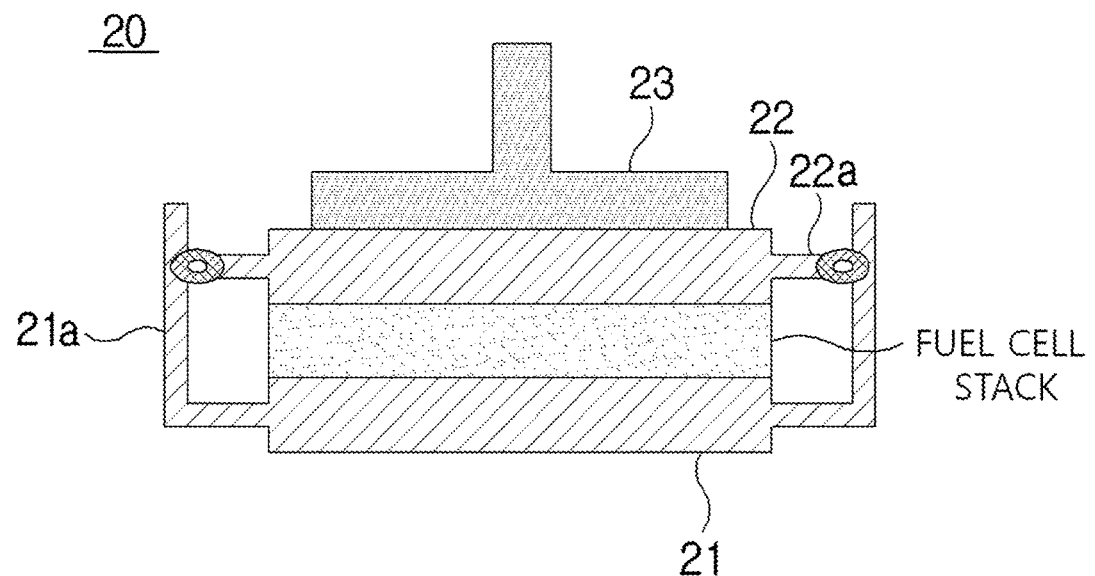
FIG. 3 is a cross-sectional view illustrating a surface pressure applying device according to the exemplary embodiment of the present invention.
Figure 4:
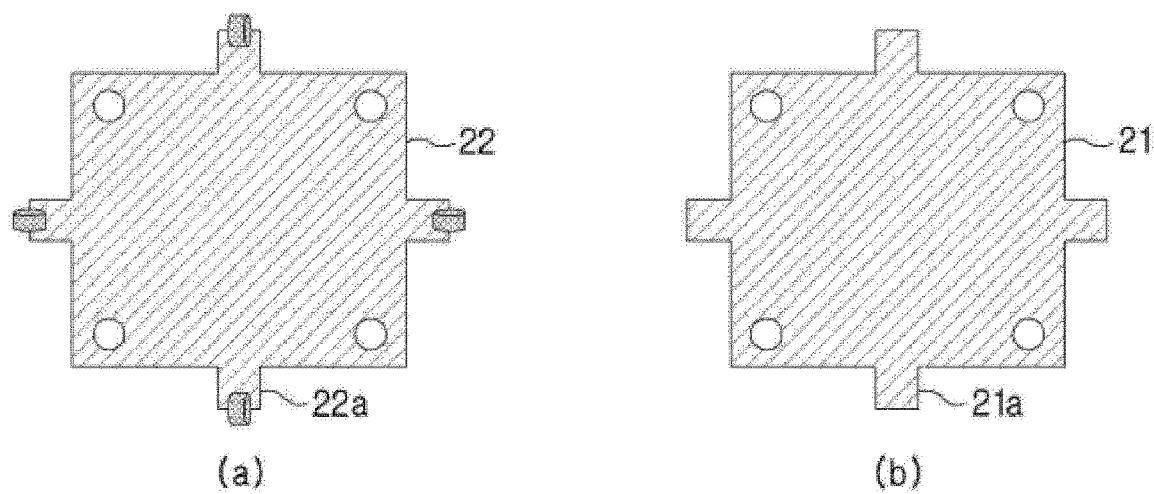
FIG. 4 is a top plan view illustrating an anode end plate and a cathode end plate according to the exemplary embodiment of the present invention.

FIG. 2 is a perspective view illustrating an apparatus for evaluating a performance of a fuel cell stack according to an exemplary embodiment of the present invention, FIG. 3 is a cross-sectional view illustrating a surface pressure applying device 20 according to the exemplary embodiment of the present invention, and FIG. 4 is a top plan view illustrating an anode end plate 21 and a cathode end plate 22 according to the exemplary embodiment of the present invention.

The apparatus for evaluating a performance of a fuel cell stack according to the present invention may include a main body and the surface pressure applying device 20. The surface pressure applying device 20 is positioned in the main body 10 and may include the anode end plate 21, the cathode end plate 22, and a surface pressure module 23.

The surface pressure applying device 20 may be included in the main body 10, and a hydraulic cylinder configured to operate the surface pressure module 23 to be described below may be positioned at an upper side of the main body 10. The hydraulic cylinder may be supplied with compressed air from the outside and reciprocally move a surface pressure transmission shaft (not illustrated) connected thereto. Therefore, a pressure generated by the hydraulic cylinder may be transmitted to the surface pressure module 23 through the surface pressure transmission shaft and may vertically compress the fuel cell stack.

The anode end plate 21 and the cathode end plate 22 are positioned at one side and the other side of the fuel cell stack, respectively, and may serve to support the respective components of the fuel cell stack so that the surface pressure is uniformly applied to the fuel cell stack. In this case, the fuel cell stack may include an anode, a cathode, an electrolyte, and a sealant. The sealant may be made of a material that has fluidity at a high temperature.

A guide unit 21a may be positioned on one surface of the anode end plate 21, and an arm 22a may be positioned on one surface of the cathode end plate 22. The guide unit 21a and the arm 22a may be coupled to each other, and the arm 22a may vertically move in a longitudinal direction of the guide unit 21a as the sealant in the fuel cell stack shrinks.

In one exemplary embodiment, the guide units 21a may be provided on four lateral surfaces of the anode end plate 21, and the arms 22a may be provided on four lateral surfaces of the cathode end plate 22.

In another exemplary embodiment, the guide units 21a and the arms 22a may be provided at multiple edges of the anode end plate 21 and multiple edges of the cathode end plate 22, respectively.

That is, the guide unit 21a may be provided at the same position as the anode end plate 21 coupled to the fuel cell stack, and the arm 22a may be provided at the same position as the cathode end plate 22 coupled to the fuel cell stack. The guide unit 21a, which is provided at the same position as the anode end plate 21, and the arm 22a, which is provided at the same position as the cathode end plate 22, may be detachably coupled.

Further, the guide unit 21a may have a guide rail (not illustrated), and the arm 22a may include a wheel which is movable along the guide rail, and a support bar which connects the wheel with the cathode end plate 22. Therefore, the wheel is coupled to the guide rail when the cathode end plate 22 is assembled to the fuel cell stack, and the wheel may be moved along the guide rail by an external pressure.

Alternatively, the arm 22a may include a ring coupled to the guide unit 21a, and a support bar which connects the ring with the cathode end plate 22.

In this case, position determining units (not illustrated) may be provided on the guide units 21a or the guide rails. The position determining units are configured to determine positions of the multiple arms provided on the cathode end plate 22, and the position determining units may position the arms positioned on the four lateral surfaces of the cathode end plate 22 at the same position, thereby adjusting the horizontal position of the cathode end plate 22.

In one exemplary embodiment, in a case in which the arms 22a, which are positioned on a right surface, a left surface, and an upper surface of the cathode end plate 22, are positioned on the position determining units provided at the same height and the arm 22a, which is positioned on a lower surface of the cathode end plate 22, is positioned at a different height, the position determining units may fix the positions of the arms 22a positioned on the right surface, the left surface, and the upper surface until the arm positioned on the lower surface reaches the position determining unit positioned at the same height.

The guide unit 21a and the arm 22a according to the present invention may be made of a ceramic material. Therefore, the guide unit 21a and the arm 22a may neither be shrunk nor deformed when the pre-processing is performed, at a high temperature, on the laminate including the fuel cell stack, the anode end plate 21, and the cathode end plate 22.

The surface pressure module 23 is configured to apply the surface pressure to the cathode end plate 22. The surface pressure module 23 is positioned between the cathode end plate 22 and the surface pressure transmission shaft and may apply a pressure to the fuel cell stack as the surface pressure transmission shaft reciprocally moves.

Method of Applying Surface Pressure to Fuel Cell Stack

A method of applying a surface pressure to a fuel cell stack according to the present invention may include: manufacturing a fuel cell stack by sequentially laminating an anode, an electrolyte, and a cathode and then mounting the fuel cell stack on a cathode end plate positioned in a main body; laminating the cathode end plate at one side of the cathode of the fuel cell stack; raising a temperature of the main body; and applying a surface pressure to the cathode end plate by using a surface pressure module.

The mounting of the cathode end plate may include coupling an arm provided on one surface of the cathode end plate and a guide unit provided on one surface of an anode end plate.

In the raising of the temperature of the main body and the applying of the surface pressure, the multiple arms may be fixed to position determining units until the multiple arms are positioned at the same position. In more detail, the raising of the temperature of the main body and the applying of the surface pressure are steps of raising an internal temperature of the main body to operate the fuel cell stack and allowing a sealant included in the fuel cell stack to shrink as the temperature increases.

In this case, a height of the fuel cell stack is decreased as the sealant shrinks. The sealant does not uniformly shrink due to a gradient of distribution of temperatures in the main body, such that the height of the fuel cell stack is not uniformly decreased. Therefore, the multiple arms may not move vertically until the multiple arms are fixed to the position determining units at the same height.

Further, when the arms are positioned on the position determining units at different heights, a surface pressure module provides a gradient to the surface pressure to be applied to the cathode end plate, such that the multiple arms may be positioned on the position determining units at the same height.

Further, since the guide unit and the arm are made of a ceramic material, the guide unit and the arm may neither be shrunk nor deformed even though the temperature of the main body is raised to a high temperature (860° C. or less) to operate the fuel cell stack.

While the present invention has been described above with reference to the exemplary embodiments, it may be understood by those skilled in the art that the present invention may be variously modified and changed without departing from the spirit and scope of the present invention disclosed in the claims.

What is claimed is:

1. An apparatus for evaluating a performance of a fuel cell stack, the apparatus comprising:
   a main body; and
   positioned within the main body, an anode end plate comprising a first surface, a cathode end plate comprising a second surface, and a surface pressure module,
   wherein the first surface and the second surface oppose one another and are configured to position the fuel cell stack between the first surface and the second surface,
   wherein the surface pressure module is configured to apply a surface pressure to the cathode end plate and compress the fuel cell stack, when present, in a vertical direction extending from the second surface to the first surface;
   wherein the anode end plate includes multiple guide units that are attached thereto;
   wherein the cathode end plate includes multiple arms on one or more lateral surfaces of the cathode end plate relative to the vertical direction, and
   wherein the multiple arms engage the multiple guide units to permit relative vertical movement between the anode end plate and the cathode end plate.

2. The apparatus of claim 1, wherein at least one arm of the multiple arms is configured to correspond to at least one guide unit of the multiple guide units, and the at least one arm is configured to vertically move the cathode end plate in response to the surface pressure applied to the cathode end plate by the surface pressure module.

3. The apparatus of claim 1, wherein the multiple guide units and the multiple arms comprise a ceramic material.

4. The apparatus of claim 1, wherein the multiple guide units is four guide units, and each of the four guide units is respectively positioned on a different lateral surface of the anode end plate.

5. The apparatus of claim 1, wherein the multiple arms is four arms, and each of the four arms is respectively positioned on a different lateral surface of the cathode end plate.

6. The apparatus of claim 1, wherein at least one of the multiple guide units has a position determining unit that is configured to adjust a horizontal position of the fuel cell stack.

7. The apparatus of claim 1, wherein at least one of the multiple arms includes:
   a wheel that is configured to move along at least one of the multiple guide units; and
   a support portion that connects the wheel to the cathode end plate.

8. The apparatus of claim 1, wherein at least one of the multiple guide units includes a rail that is configured to guide a vertical movement of at least one arm of the multiple arms.

9. The apparatus of claim 1, wherein the surface pressure module is operably connected to a hydraulic cylinder.

10. The apparatus of claim 1, wherein the surface pressure module is operably connected to a surface pressure transmission shaft, and the surface pressure module is positioned between the cathode end plate and the surface pressure transmission shaft.

11. The apparatus of claim 10, wherein the surface pressure module is configured to apply the surface pressure to the cathode end plate as the surface pressure transmission shaft reciprocally moves.

12. The apparatus of claim 1, wherein the multiple arms are configured to move vertically in a longitudinal direction of the multiple guide units in response to the surface pressure applied to the cathode end plate by the surface pressure module.

13. The apparatus of claim 1, wherein at least two arms of the multiple arms are on a single lateral surface of the cathode end plate.

14. The apparatus of claim 1, wherein at least two guide units of the multiple guide units are on a single lateral surface of the anode end plate.

15. The apparatus of claim 1, wherein at least one of the multiple arms comprises:
   a ring that is coupled to at least one of the multiple guide units; and
   a support bar that connects the ring to the cathode end plate.

16. A method of applying a surface pressure to a fuel cell stack comprising:
   providing a fuel cell stack on the cathode end plate in the main body of the apparatus of claim 1; and
   applying the surface pressure to the cathode end plate by using the surface pressure module.

17. The method of claim 16, further comprising increasing a temperature of the main body.

18. The method of claim 16, wherein providing the fuel cell stack on the cathode end plate in the main body of the apparatus comprises coupling at least one arm of the multiple arms on at least one lateral surface of the cathode end plate; and coupling at least one guide unit of the multiple guide units on at least one lateral surface of the anode end plate.

19. The method of claim 1, wherein the anode end plate includes the multiple guide units on multiple lateral surfaces of the anode end plate; and wherein the cathode end plate includes the multiple arms on multiple lateral surfaces of the cathode end plate.

20. The apparatus of claim 1, wherein the multiple guide units are vertically disposed.

21. The apparatus of claim 1, in combination with the fuel cell stack, wherein the fuel cell stack is positioned between the first surface and the second surface.

* * * * *